(12) United States Patent
Masaki et al.

(10) Patent No.: US 6,639,725 B2
(45) Date of Patent: Oct. 28, 2003

(54) PROTECTIVE, DIFFUSIVE FILM AND PROCESS FOR PRODUCING THE SAME

(75) Inventors: Tadahiro Masaki, Shinjuku-Ku (JP); Fumihiro Arakawa, Shinjuku-ku (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 10/144,756

(22) Filed: May 15, 2002

(65) Prior Publication Data

US 2003/0002158 A1 Jan. 2, 2003

(30) Foreign Application Priority Data

May 18, 2001 (JP) .......................................... 2001-149619

(51) Int. Cl.[7] .............................................. G02B 13/20
(52) U.S. Cl. ........................ 359/599; 359/566; 359/707; 359/709; 359/710
(58) Field of Search ................................ 359/599, 566, 359/707, 708, 709, 710; 349/64, 63, 69, 96, 112; 362/31; 385/147, 133, 141

(56) References Cited

U.S. PATENT DOCUMENTS

| | | | | |
|---|---|---|---|---|
| 4,322,125 A | * | 3/1982 | Warren | 359/359 |
| 4,419,397 A | * | 12/1983 | Neat et al. | 428/141 |
| 4,802,737 A | * | 2/1989 | Denton | 359/588 |
| 5,061,874 A | * | 10/1991 | Hecq et al. | 313/478 |
| 5,706,065 A | * | 1/1998 | Yano | 349/112 |
| 6,076,933 A | * | 6/2000 | DiLoreto et al. | 359/614 |
| 6,483,976 B2 | * | 11/2002 | Shie et al. | 385/133 |
| 6,529,678 B2 | * | 3/2003 | Shie et al. | 385/147 |

* cited by examiner

*Primary Examiner*—Mohammad Sikder
(74) *Attorney, Agent, or Firm*—Parkhurst & Wendel, L.L.P.

(57) ABSTRACT

There is provided a protective, diffusive film for use in a surface light source device provided with a lens film, said protective, diffusive film comprising: a transparent substrate layer; and a resin layer provided on the top surface and the under surface of the transparent substrate layer, the resin layers being free from fine particles and having fine concaves and convexes on the surface thereof, the difference in coverage between the resin layer provided on the top surface of the transparent substrate layer and the resin layer provided on the under surface of the transparent substrate layer being in the range of −20% to +20% in terms of the percentage of the coverage of one of the resin layers to the coverage of the other resin layer.

8 Claims, 5 Drawing Sheets

PROTECTIVE, DIFFUSIVE FILM AND PROCESS FOR PRODUCING THE SAME

BACKGROUND OF THE INVENTION

1. Field of the Invention

The present invention relates to a protective, diffusive film and more particularly to a high-quality protective, diffusive film which can suppress curling and deflection, a process for producing the same, and a surface light source device and a liquid crystal display device using said protective, diffusive film.

2. Background Art

A large number of surface light source devices provided with a protective, diffusive film have hitherto been proposed. An example of a surface light source device using a protective, diffusive film 110 is shown in FIG. 5. FIG. 5 is a cross-sectional view of a liquid crystal display device 135 provided with a surface light source device 120 which is an edge-type flat light source. The surface light source device 120 comprises, for example, a light source 121, a light guide plate 122, a reflection film 124, a light diffusive film 125, a lens film 140, and a protective, diffusive film 110.

The light guide plate 122 is surface light projection means, and has a light source 121 on its side end and, on its non-light-outgoing surface remote from a light outgoing surface 122a, a dot pattern 123 for diffusing light from the light source 121 and directing the light to a light outgoing direction. The reflection film 124 is provided on the non-light-outgoing surface side of the light guide plate 122 and functions to block off unnecessary light beams and, at the same time, to reflect and return light beams to a predetermined direction.

A lens film 140 is disposed on the light outgoing surface 122a side of the light guide plate 122 through a light diffusive film (a diffusive plate) 125 for diffusing light to conceal the dot pattern 123 in such a manner that the lens film 140 on its prism surface 140a faces the light outgoing surface side.

In order to impart the function of diffusing light to the light diffusive film (diffusive plate) 125, the light diffusive film (diffusive plate) 125 has hitherto been formed by incorporating, in a dispersed state, organic or inorganic beads as a light diffusing agent into a transparent resin substrate, or by coating an ink containing organic or inorganic beads as a diffusing agent onto a transparent resin substrate.

A protective, diffusive film 110 is provided on the light outgoing surface side of the lens film 140, for preventing the prism 140a in the lens film 140 and a liquid crystal display element 133 from coming into direct contact and being damaged by each other, for example, due to vibration in transit. The protective, diffusive film 110 also has the function of slightly diffusing light for concealing stripes of the prism 140a in the lens film 140, a spacer (not shown), and the like. To this end, the protective, diffusive film 110 has hitherto been formed by incorporating, in a dispersed state, organic or inorganic beads as a light diffusing agent into a transparent resin substrate, or by coating an ink containing organic or inorganic beads as a diffusing agent onto a transparent resin substrate. A transmission liquid crystal display element 133 comprising a liquid crystal layer 130 sandwiched between a lower substrate 132 and an upper substrate 131 is provided on the light outgoing side of the surface light source device 120, and the liquid crystal display element 133 is illuminated from backside by the surface light source device 120.

The conventional protective, diffusive film 110 is generally formed by coating an diffusing ink (an ink prepared by adding a diffusing agent in a resin) on both sides of a transparent substrate. As shown in Table 1, there is a difference in coverage between the coating on the top surface of the transparent substrate and the coating on the under surface of the transparent substrate.

TABLE 1

Difference in coverage between coating on top surface and coating on under surface of protective, diffusive film

| | Coverage | Function |
|---|---|---|
| Viewer side (top surface) | Large | Impartation of light diffusive properties |
| Light source side (under surface) | Small | Prevention of interference fringe appearance defects (prevention of sticking |

In the conventional protective, diffusive film, when the difference in coverage between the coating on the top surface of the transparent resin substrate and the coating on the under surface of the transparent resin substrate is large, curling and/or deflection are likely to occur through the action of heat and/or humidity. This is considered attributable to the difference in stretching, derived from the difference in coverage, between the diffusing ink coating on the top surface of the transparent resin substrate and the diffusing ink coating on the under surface of the transparent resin substrate. In particular, under conditions within backlight for a liquid crystal display device which is brought to a closed space in which the temperature is raised to a high temperature, i.e., up to about 90° C., "deflection" of the film sometimes occurred. When the coverage of the coating on the light source side (under surface) was made substantially equal to the coverage of the coating on the viewer side (top surface), the following phenomena often occurred. (i) The concaves and convexes on the surface were reduced, and interference fringe appearance defects between the protective, diffusive film and the underlying light guide plate or lens film sometimes occurred. (ii) Increasing the amount of the diffusing agent (fine particles) enhanced diffusive properties (i.e., enhanced the haze value) and consequently lowered the utilization of light and sometimes deteriorated luminance.

In the conventional protective, diffusive film, the diffusive properties was imparted by adding a diffusing agent to the resin. Therefore, a variation in coverage caused a change in diffusive properties or a change in the shape of surface concaves and convexes. This sometimes affected the optical characteristics and the sticking preventive properties.

SUMMARY OF THE INVENTION

The present inventor has now found that, when resin layers are provided respectively on the top surface and the under surface of the substrate layer by not using any diffusing agent (for example, finely particulate material) and bringing the difference in coverage between the resin layer provided on the top surface of the substrate layer and the resin layer provided on the under surface of the substrate layer to a value falling within a specific range, curling and deflection can be effectively prevented and, consequently, a high-quality protective, diffusive film can be provided. The present invention has been made based on such finding.

Accordingly, it is an object of the present invention to provide a protective, diffusive film possessing excellent optical characteristics and sticking preventive properties.

According to one aspect of the present invention, there is provided a protective, diffusive film provided with a lens film, said protective, diffusive film comprising:

a transparent substrate layer; and a resin layer provided on the top surface and the under surface of the transparent substrate layer, said resin layers being free from fine particles and having fine concaves and convexes on the surface thereof, the difference in coverage between the resin layer provided on the top surface of the transparent substrate layer and the resin layer provided on the under surface of the transparent substrate layer being in the range of −20% to +20% in terms of the percentage of the coverage of one of the resin layers to the coverage of the other resin layer.

According to another aspect of the present invention, there is provided a process for producing the protective, diffusive film according to the present invention, said process comprising the steps of:

introducing an ionizing radiation-curable resin into a cylinder having an inverted shape of concaves and convexes of the resin layer; and applying an ionizing radiation to the ionizing radiation-curable resin to cure the ionizing radiation-curable resin to form concaves and convexes.

DETAILED DESCRIPTION OF THE INVENTION

Embodiments of the Present Invention

Figure 1:
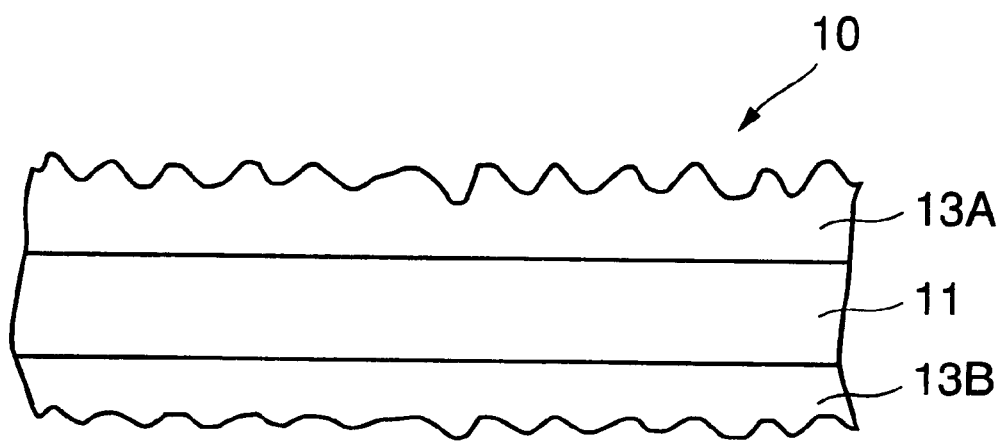
FIG. 1 is a partially enlarged cross-sectional view of a protective, diffusive film.

Embodiments of the present invention will be explained while making reference to elements with reference characters attached thereto. However, it should be noted that the present invention is not to be construed as being limited to these embodiments.

According to a first embodiment of the present invention, there is provided a protective, diffusive film (10) for use in a surface light source device (20) provided with a lens film (40), said protective, diffusive film (10) comprising:

a transparent substrate layer (11); and resin layers (13A, 13B) which are provided on both sides of the transparent substrate layer, are free from fine particles, and have fine concaves and convexes on the surface thereof, wherein the difference in coverage between the resin layers, with fine concaves and convexes provided on the surface thereof, provided respectively on both sides of the transparent substrate layer (in the present invention, these resin layers being referred to also as "protective, diffusive layers"), that is, between the resin layer provided on the top surface of the transparent substrate layer and the resin layer provided on the under surface of the transparent substrate layer, is in the range of −20% to +20% in terms of the percentage of the coverage of one of the resin layers to the coverage of the other resin layer.

According to a second embodiment of the present invention, there is provided a protective, diffusive film wherein, in the protective, diffusive film (10) according to the first embodiment of the present invention, the resin layers free from fine particles and having fine concaves and convexes on the surface thereof, that is, the resin layer provided on the top surface of the transparent substrate layer and the resin layer provided on the under surface of the transparent substrate layer are identical to each other in components constituting the layer.

According to a third embodiment of the present invention, there is provided a protective, diffusive film wherein, in any one of the protective, diffusive films (10) according to the first and second embodiments of the present invention, the resin layer having on its surface fine concaves and convexes is formed of an ionizing radiation-cured resin.

According to a fourth embodiment of the present invention, there is provided a process for producing a protective, diffusive film (10) according to any one of the first to third embodiments of the present invention, said process comprising the steps of:

shaping the ionizing radiation-curable resin by means of a cylinder plate (88) having a mold shape conforming to the shape of said concaves and convexes (step of shaping); and applying an ionizing radiation to the ionizing radiation-curable resin to cure the ionizing radiation-curable resin (step of curing).

According to a fifth embodiment of the present invention, there is provided a surface light source device comprising:

a light source (21);

surface light projection means (22) for surface projecting light, emitted from the light source, from a light projection surface (22a) to a predetermined direction;

a lens film (40) provided on the light projection surface; and the protective, diffusive film, according to any one of the first to fourth embodiments of the present invention, provided on the light outgoing surface side of the lens film.

According to a sixth embodiment of the present invention, there is provided a liquid crystal display device (35) comprising:

a light source (21);

surface light projection means (22) for surface projecting light, emitted from the light source, from a light projection surface (22a) to a predetermined direction;

a lens film (40) provided on the light projection surface;

the protective, diffusive film (10), according to any one of the first to fourth embodiments of the present invention, provided on the light outgoing surface side of the lens film; and a transmission liquid crystal display element (33) disposed on the light outgoing surface side of the protective, diffusive film.

Protective, Diffusive Film

An embodiment of the protective, diffusive film according to the present invention is shown in FIG. 1. The protective, diffusive film in this embodiment will be described with reference to FIG. 1. A protective, diffusive film 10 comprises a substrate film 11 and resin layers (protective, diffusive layers 13A, 13B) provided respectively on both sides of the substrate film 11.

In the present invention, any diffusing agent (for example, finely particulate material) is not used in the resin layers constituting the protective, diffusive film. Further, the difference in coverage between the resin layer (protective, diffusive layer 13A) provided on the top surface of the transparent substrate film and the resin layer (protective, diffusive layer 13B) provided on the under surface of the transparent substrate film is in the range of −20% to +20% in terms of the percentage of the coverage of one of the resin layers to the coverage of the other resin layer. By virtue of the adoption of the above construction, the protective, diffusive film according to the present invention has good concealment properties and optical characteristics.

a) Transparent Substrate Layer

The transparent substrate layer (substrate film 11) is specifically formed of a stretched or unstretched film of a thermoplastic resin, such as cellulosetriacetate, polyester, polyamide, polyimide, polypropylene, polymethyl pentene, polyvinyl chloride, polyvinyl acetal, polymethyl methacrylate, polycarbonate, or polyurethane. The thickness of the transparent substrate layer is preferably 50 to 200 μm from the viewpoint of handleability, such as processability, although the thickness also varies depending upon the rigidity of the film. The transparent substrate layer on its top surface and under surface, where the resin layers (protective, diffusive layers 13A, 13B) are provided, is preferably subjected to easy-adhesion treatment, such as corona discharge treatment, from the viewpoint of highly stabilizing the adhesion to the resin layers to be stacked.

b) Resin Layer

In the present invention, the resin layers (protective, diffusive layers 13A, 13B) have, on the surface thereof, fine concaves and convexes and protect members which come into contact with the protective, diffusive film, and have concealment effect by virtue of a suitable level of light diffusion properties.

According to a preferred embodiment of the present invention, the resin layers (protective, diffusive layers 13A, 13B) are identical to each other in components constituting the layer.

The resin layers (protective, diffusive layers 13A, 13B) each preferably have a surface roughness index Rz (ten-point mean roughness) in the range of 1 to 6 μm. When the surface roughness index Rz is in this range, the concealment properties and the optical characteristics are good. For example, the Rz value of the protective, diffusive layers 13A, 13B (embodiment of the present invention) shown in FIG. 1 is 1.6 μm.

A haze defined as the ratio of the luminance of an object to the luminance of the object as viewed through a scattering medium is used as a measure of the level of light diffusion. The haze of the protective, diffusive film 10 is preferably in the range of 15 to 50, more preferably in the range of 20 to 40. When the haze is in this range, the concealment properties of the protective, diffusive film and the luminance are good. For example, the haze of the protective, diffusive film 10 shown in FIG. 1 (embodiment of the present invention) is 30.

Figure 2:
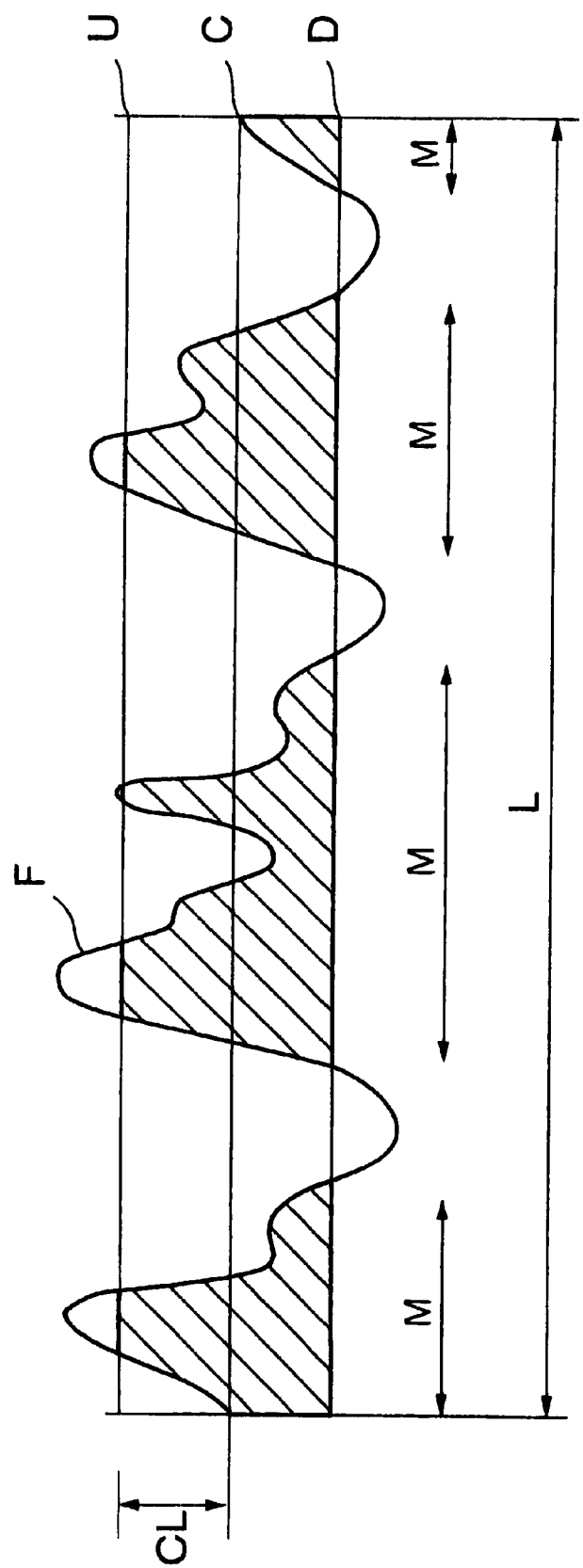
FIG. 2 is a diagram illustrating a Pc1 method.

The count of Pc (profile peaks) in the resin layers (protective, diffusive layers 13A, 13B) is preferably in the range of 2 to 15. When the count of Pc is in this range, the concealment properties and the optical characteristics are good. The count of Pc (profile peaks) may be measured by a Pc1 method. The Pc1 method will be described with reference to FIG. 2. In the Pc1 method, a count level CL is set, and two lines parallel to a center line C of a roughness curve F, an upper peak count level U and a lower peak count level D, are provided. In a portion between two points where the lower peak count level D crosses the roughness curve F, when one or more points, where the upper peak count level U crosses the roughness curve F, exist, this is counted as one profile peak. This count is carried out for a reference length L, and the surface roughness is expressed in terms of the count of the profile peaks. In the embodiment shown in FIG. 2, since there are four profile peaks, the count of Pc (profile peaks) as measured by the Pc1 method is 4.

In the case of the protective, diffusive layers 13A, 13B (embodiment of the present invention) shown in FIG. 1, the count of Pc (profile peaks) as measured under conditions specified in Table 2 below is 8.

TABLE 2

| Measurement conditions (Pc1 method) | |
|---|---|
| Longitudinal magnification: | 2000 times |
| Lateral magnification: | 50 times |
| Reference length: | 0.8 mm |
| Phase characteristics: | Normal |
| Feed rate: | 0.1 mm/sec |
| Count level: | ±0.1 μm |

The resin layers (protective, diffusive layers 13A, 13B) are formed from a composition containing an oligomer or a prepolymer of, for example, a (meth)acrylate (here "(meth) acrylate" referring to both acrylate and methacrylate) of a polyfunctional compound, such as a polyhydric alcohol, and a relatively large amount of a reactive diluent. Specific examples of the diluent include: monofunctional monomers, for example, ethyl (meth)acrylate, ethylhexyl (meth) acrylate, styrene, vinyltoluene, and N-vinylpyrrolidone; and polyfunctional monomers, for example, trimethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa (meth)acrylate, 1,6-hexanediol di(meth)acrylate, and neo-pentylglycol di(meth)acrylate. According to a preferred embodiment of the present invention, an ionizing radiation-curable resin may be mentioned as the resin for use in the formation of the resin layer, and the above-described monomers or oligomers and the like may be mentioned as compositions for use in the formation of the resin layers.

When the ionizing radiation-curable resin is an ultraviolet-curable resin, a photopolymerization initiator may be used. Specific examples of photopolymerization initiators include acetophenones, benzophenones, Michler's benzoyl benzoate, α-amyloxime esters, and thioxanthones. Photosensitizers usable herein include n-butylamine, triethylamine, and tri-n-butylphosphine.

The ionizing radiation-curable resin may contain a reactive organosilicon compound represented by formula

wherein R and R' each represent an alkyl group having 1 to 10 carbon atoms;

m+n=4; and m and n are each an integer.

Specific examples of organosilicon compounds include tetramethoxysilane, tetraethoxysilane, tetra-iso-propoxysilane, tetra-n-propoxysilane, tetra-n-butoxysilane, tetra-sec-butoxysilane, tetra-tert-butoxysilane, tetrapentaethoxysilane, tetrapenta-iso-propoxysilane, tetrapenta-n-propoxysilane, tetrapenta-n-butoxysilane, tetrapenta-sec-butoxysilane, tetrapenta-tert-butoxysilane, methyltrimethoxysilane, methyltriethoxysilane, methyltripropoxysilane, methyltributoxysilane, dimethyldimethoxysilane, dimethyldiethoxysilane, dimethylethoxysilane, dimethylmethoxysilane, dimethylpropoxysilane, dimethylbutoxysilane, methyldimethoxysilane, methyldiethoxysilane, and hexyltrimethoxysilane.

Alternatively, the resin layers (protective, diffusive layers 13A, 13B) may be formed of a thermoplastic resin. Examples of thermoplastic resins usable herein include: acrylic resins, such as methyl methacrylate and ethyl methacrylate; polyesters, such as polyethylene terephthalate, polybutylene terephthalate, and polyethylene naphthalate; polyhydrocarbons, such as polycarbonate, polystyrene, polypropylene, and polymethyl pentene; polyamides, such as 6,6-nylon and 6-nylon; saponification products of ethylene-vinyl acetate copolymers; polyimides; polysulfones; polyvinyl chlorides; and acetylcellulose.

Production Process of Protective, Diffusive Film

Figure 3:
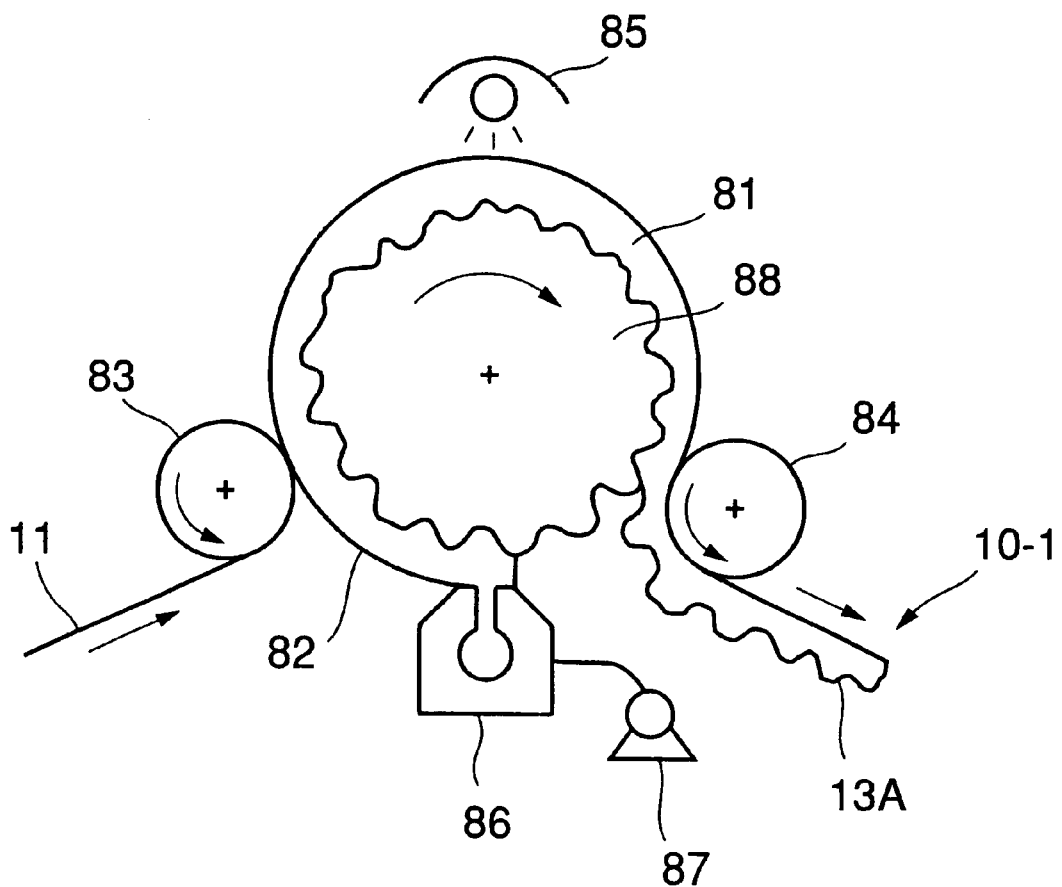
FIG. 3 is a schematic diagram illustrating a process for forming a protective, diffusive layer 13A.

A process for producing a protective, diffusive film will be described with reference to FIG. 3. A substrate film 11 is fed through an inlet nip 83 to a cylinder plate 88 having an inverted shape of concaves and convexes provided on the surface of the resin layer to be formed. An ionizing radiation-curable resin 82 is fed through a pump 87 to a die head 86 and is evenly introduced into the cylinder plate 88. After the substrate film 11 is brought into intimate contact with the cylinder plate 88 by means of an inlet nip 83 (step of shaping), an ionizing radiation is applied to the assembly by an ionizing radiation exposure system 85 (a D-bulb ultraviolet lamp, manufactured by Fusion) to form an ionizing radiation-cured resin 81 which is adhered to the substrate film 11 (step of curing). Thereafter, at an outlet nip 84, the protective, diffusive layer 13A formed on the substrate film 11 is separated from the cylinder plate 88 to form a film 10-1 which is a form in the course of the formation of a protective, diffusive film 10. A protective, diffusive layer 13B is further formed by the same step as described above on the film 10-1 to produce the protective, diffusive film 10 shown in FIG. 1.

According to another embodiment of the present invention, the upper resin layer (protective, diffusive layer 13A) and the lower resin layer (protective, diffusive layer 13B) can be produced respectively using cylinder plates which are identical to or different from each other in the shape of concaves and convexes.

The production process of the present invention is a roll-to-roll continuous shaping process by DPS and thus can produce a larger amount of and more inexpensive protective, diffusive films as compared with the conventional production process.

Surface Light Source Device and Liquid Crystal Display Device

Figure 4:
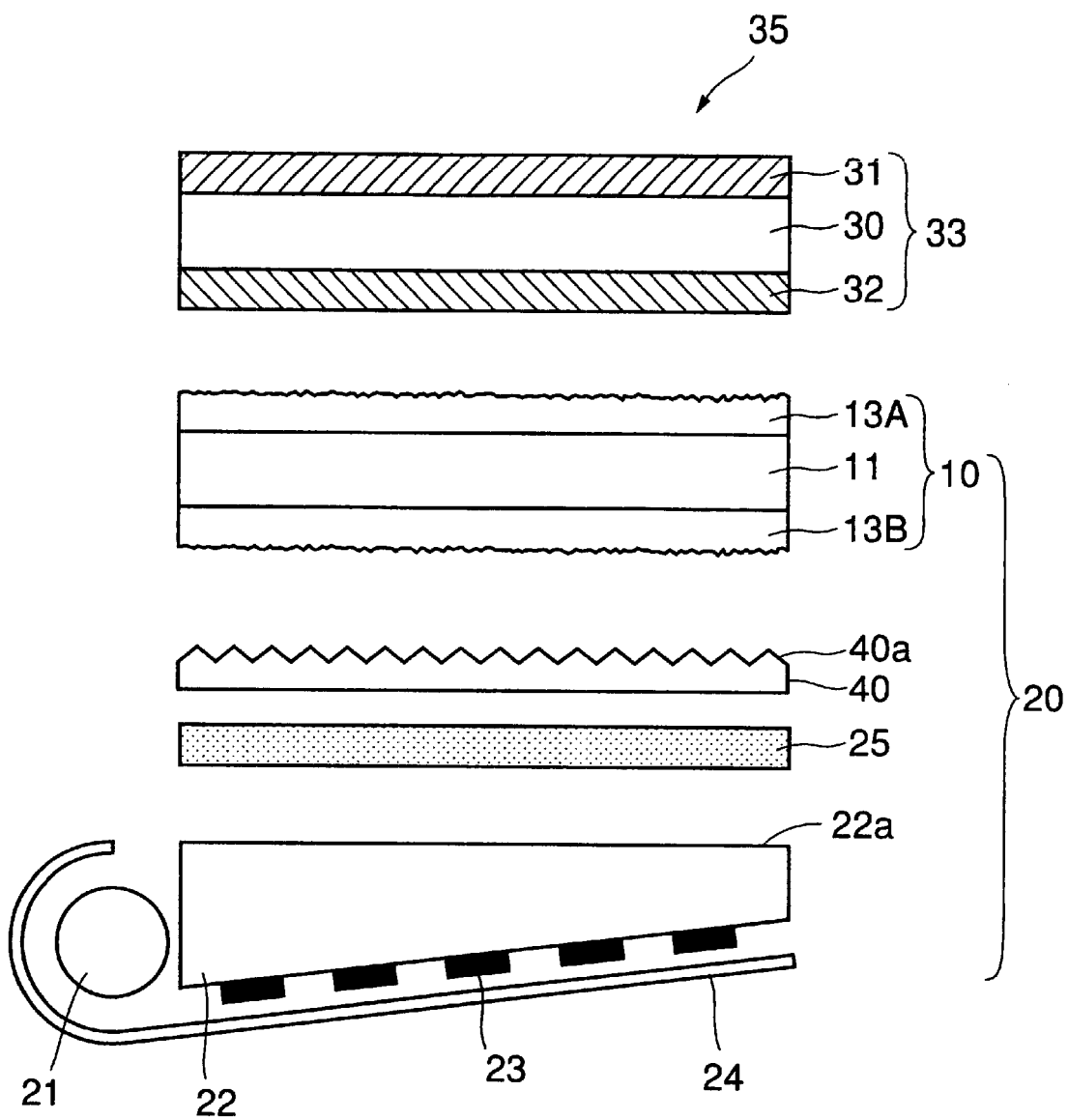
FIG. 4 is a cross-sectional view of a liquid crystal display device 35 provided with a surface light source device 20 using a protective, diffusive film 10.
Figure 5:
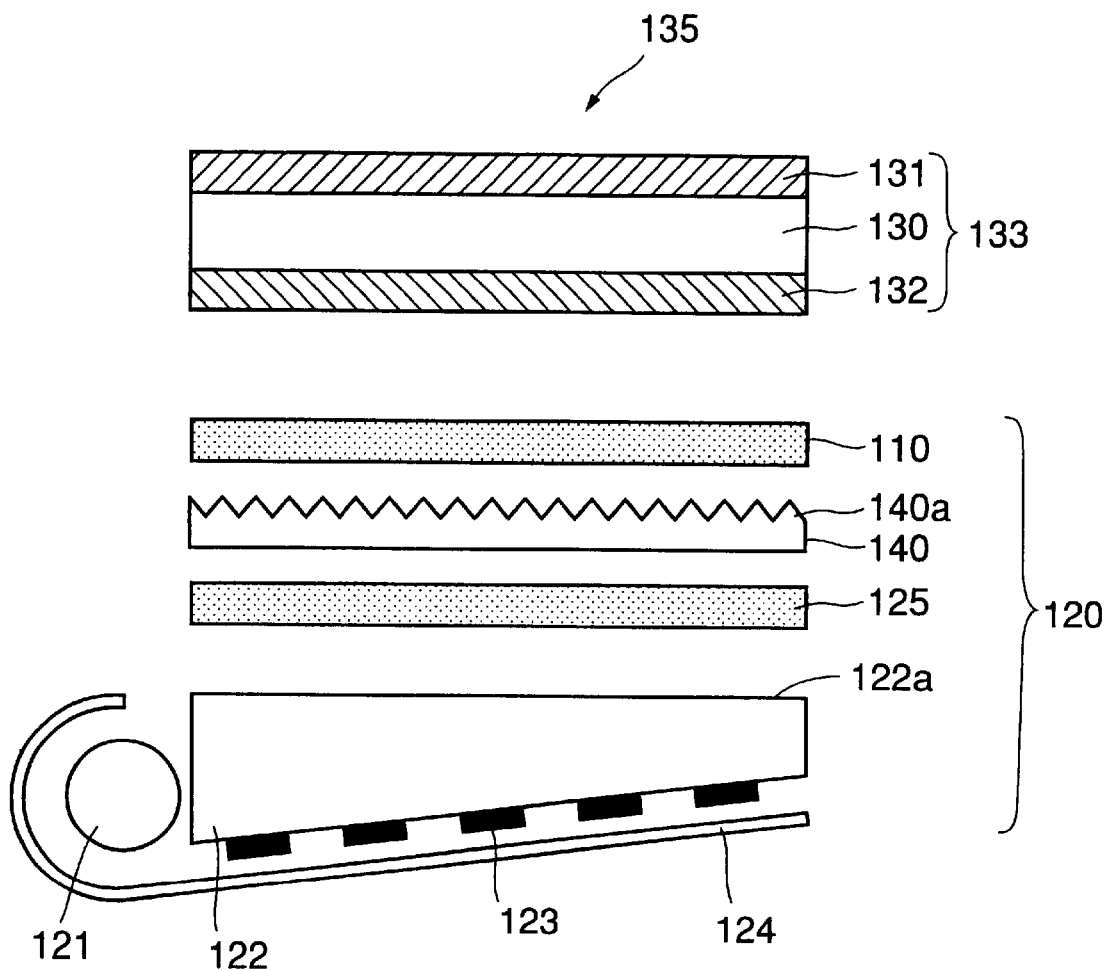
FIG. 5 is a cross-sectional view of a liquid crystal display device 135 provided with a surface light source device 120 using a conventional protective, diffusive film 110.

As shown in FIG. 4, the protective, diffusive film 10 according to the present invention may be used to produce a liquid crystal display device 35 provided with a surface light source device 20. The surface light source device 20 comprises, for example, a light source 21, a light guide plate 22, a reflection film 24, a light diffusive film 25, a lens film 40, and a protective, diffusive film 10. A protective, diffusive film 10 is provided on the lens film 40 in its light outgoing surface side from the viewpoint of preventing the prism 40a in the lens film 40 and a liquid crystal display element 33 from coming into direct contact and being damaged by each other, for example, due to vibration in transit. The liquid crystal display device 35 provided with the surface light source device 20 can be produced from the protective, diffusive film 10 and other elements described above as elements constituting the liquid crystal display device 135.

EXAMPLES

The following examples further illustrate the contents of the present invention, but should not be construed as limiting the present invention.

Example 1

Protective, Diffusive Film

A protective, diffusive film 10 was produced using the following materials by the above-described production process. The coverage of the resin (protective, diffusive layer 13A) on the top surface of the transparent substrate film 11 and the coverage of the resin (protective, diffusive layer 13B) on the under surface of the transparent substrate film 11 were 10 g/m$^2$ and 11 g/m$^2$, respectively.

Transparent substrate film 11: PET film (A 4300 (thickness 125 $\mu$m), manufactured by Toyobo Co., Ltd.)

Resin layers (protective, diffusive layers 13A, 13B): Ultraviolet-curable resin (RC 19-941, manufactured by Dainippon Ink and Chemicals, Inc.)

Cylinder plate: Liquid sand (#250) was blown against the surface of a cylindrical iron material to perform sandblasting, whereby concaves and convexes corresponding to the shape of concaves and convexes provided on the surface of the resin layer were formed. Further, electrolytic polishing was carried out for finishing, followed by chromium plating for protection purposes to prepare a cylinder plate.

Surface Light Source Device

A surface light source device was produced using the protective, diffusive film 10 prepared above and the following light diffusive film and lens film.

Light diffusive film: Light diffusive film D 121, manufactured by TSUJIDEN Co., Ltd.

Lens film: BEF 2, manufactured by Sumitomo 3M Ltd.

Comparative Example 1

A film D 117 U (manufactured by TSUJIDEN Co., Ltd.) was used as a protective, diffusive film.

Comparative Example 2

A protective, diffusive film was produced in the same manner as in Example 1, except that the coverage of the resin constituting the protective, diffusive layer 13B was changed to 15 g/m$^2$.

Evaluation Tests

The protective, diffusive films prepared in the example and comparative examples were subjected to the following evaluation tests for deflection and curling.

Evaluation Method

Each of the protective, diffusive films prepared in the example and comparative examples was cut into a size of 15 cm×20 cm, was placed on a glass plate, and was allowed to stand in an atmosphere of 50° C. and 90% RH. Two hr after the initiation of the standing, the protective, diffusive films were taken out from the atmosphere of 50° C. and 90% RH and were air cooled for 10 min in an atmosphere of room temperature and ordinary humidity. Thereafter, the maximum height of the lifted portion caused within the protective, diffusive films (sheets) due to curling or deflection was measured with a first grade ruler specified in JIS. The lift level was measured for both sides of the protective, diffusive films. The difference in form between before the evaluation test and after the evaluation test was visually inspected.

Evaluation Results

The maximum height of the lifted portion was as shown in Table 3. Further, the difference in form between before the evaluation test and after the evaluation test by visual inspection was as follows.

For Example 1, for both the protective, diffusive layers 13A and 13B, lifting and curling hardly occur.

For Comparative Example 1, curling occurred in the shrink direction of the protective, diffusive layer provided on the top surface and the protective, diffusive layer provided on the under surface.

For Comparative Example 2, curling occurred in the shrink direction of the protective, diffusive layer provided on the under surface.

TABLE 3

| Maximum height of lifted portion | |
|---|---|
| Example 1 | 0.2 mm |
| Comparative Example 1 | 2.0 mm |
| Comparative Example 2 | 1.8 mm |

What is claimed is:

1. A protective, diffusive film for use in a surface light source device provided with a lens film, said protective, diffusive film comprising:

a transparent substrate layer; and a resin layer provided on the top surface and the under surface of the transparent substrate layer, said resin layers being free from fine particles and having fine concaves and convexes on the surface thereof, the difference in coverage between the resin layer provided on the top surface of the transparent substrate layer and the resin layer provided on the under surface of the transparent substrate layer being in the range of −20% to +20% in terms of the percentage of the coverage of one of the resin layers to the coverage of the other resin layer.

2. The protective, diffusive film according to claim 1, wherein the resin layer provided on the top surface of the transparent substrate layer and the resin layer provided on the under surface of the transparent substrate layer are identical to each other in components constituting the layer.

3. The protective, diffusive film according to claim 1, wherein the resin layers each are formed of an ionizing radiation-cured resin.

4. A The protective, diffusive film according to claim 1, which has a haze in the range of 15 to 50.

5. The protective, diffusive film according to claim 1, wherein the count of Pc (profile peaks) in each of the resin layer provided on the top surface of the transparent substrate layer and the resin layer provided on the under surface of the transparent substrate layer is in the range of 2 to 15 as measured by a Pc1 method.

6. A process for producing a protective, diffusive film according to claim 1, said process comprising the steps of:

introducing an ionizing radiation-curable resin into a cylinder having an inverted shape of concaves and convexes of the resin layer; and applying an ionizing radiation to the ionizing radiation-curable resin to cure the ionizing radiation-curable resin to form concaves and convexes.

7. A surface light source device comprising:

a light source;

surface light projection means for surface projecting light, emitted from the light source, from a light projection surface to a predetermined direction;

a lens film provided on the light projection surface side of the surface light projection means; and the protective, diffusive film, according to claim 1, provided on the light outgoing surface side of the lens film.

8. A liquid crystal display device comprising:

the surface light source device according to claim 7; and a transmission liquid crystal display element, said liquid crystal display element being disposed on the light outgoing surface side of the protective, diffusive film.

* * * * *